P. A. SCHULERT.
BOW SUPPORT FOR AUTO TOPS.
APPLICATION FILED JAN. 29, 1914.
1,149,955.
Patented Aug. 10, 1915.
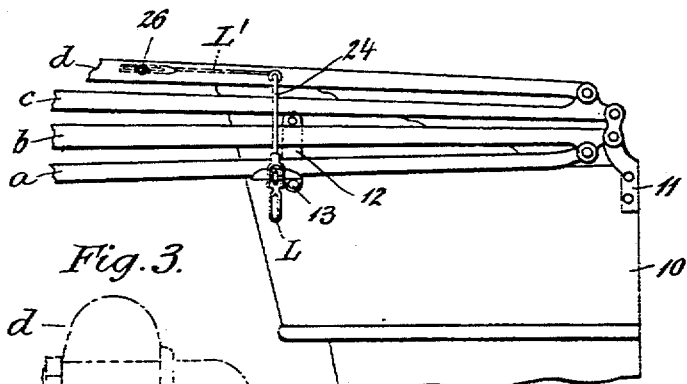
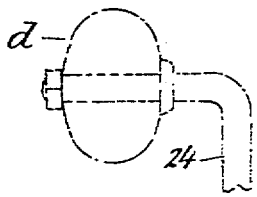
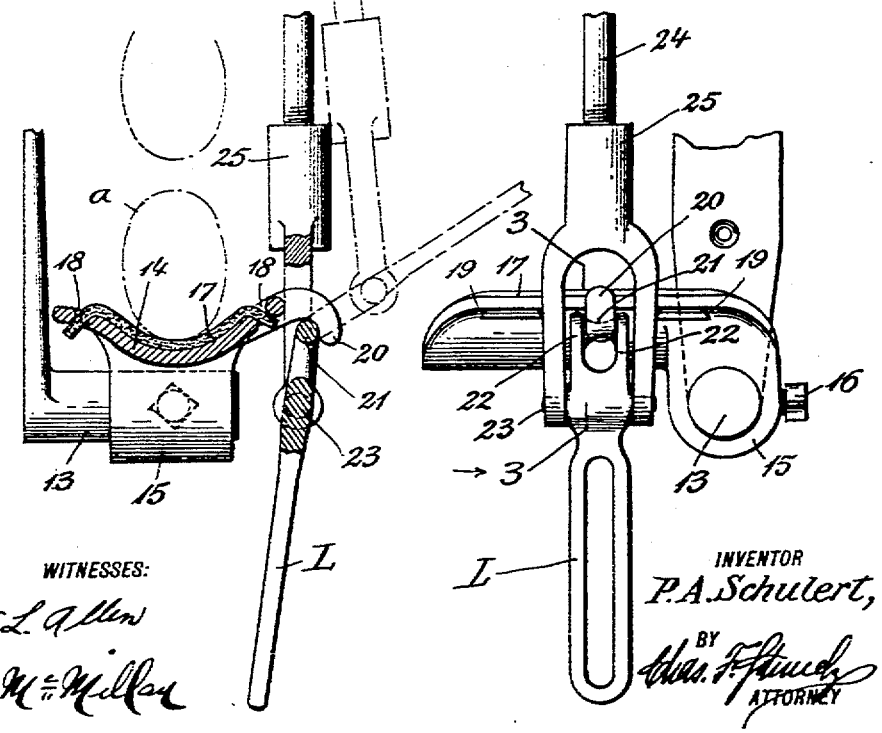

UNITED STATES PATENT OFFICE.

PAUL A. SCHULERT, OF DETROIT, MICHIGAN.

BOW-SUPPORT FOR AUTO-TOPS.

1,149,955.  Specification of Letters Patent.  Patented Aug. 10, 1915.

Application filed January 29, 1914. Serial No. 815,102.

*To all whom it may concern:*

Be it known that I, PAUL A. SCHULERT, a citizen of the United States, residing at Detroit, in the county of Wayne and State of Michigan, have invented certain new and useful Improvements in Bow-Supports for Auto-Tops, of which the following is a specification.

This invention relates to automobile tops, and more particularly to the supports for the bows thereof, and it has for one of its objects the provision of improved means whereby the bows of the top are firmly held together when the latter is in folded condition.

The invention has, furthermore, for its object the provision of a bow holder which comprises as one of its elements a link permanently carried on the uppermost bow and adapted to be connected to a member stationary on the body of the automobile or other vehicle, as the case may be.

Further objects of the invention will hereinafter appear and be particularly defined in the claim.

The invention has been clearly illustrated in the accompanying drawings in which similar characters denote similar parts and in which:—
Figure 1 is a fractional side view of a vehicle body, the several bows being shown in folded condition. Fig. 2 is a side view, on an enlarged scale, of the bow-holding bracket attached to the body of the vehicle.
Fig. 3 is a cross-section thereof, substantially on line 3—3 of Fig. 2.

Referring to the drawings, 10 denotes the body of the vehicle having at its side a bracket 11 to which the bows for the canvas or other top of the vehicle are pivoted. In the present instance four bows are shown articulated to each other in any suitable and well-known manner, these bows being disposed so as to lie on the outside of the body when in folded condition.

Secured to the body of the vehicle is a bracket 12 having at its lower end a sidewise-projecting stud 13 to which the bow holder proper may be detachably secured, this bow holder comprising a rest member 14 made in the shape of a trough adapted to receive the lowermost bow *a*. The rest member 14 is also provided with a lug 15 which is apertured to fit on the stud above mentioned and which may be secured thereto by a set screw 16, as shown.

Inasmuch as the several bows are generally finished or lacquered, the rest member 14 is provided with a lining 17 of leather or other suitable material, to prevent abrasion, and in the present instance this lining is held in place by having its opposite edges forced through slots 18 provided in the side flanges of the rest member 14, respectively. The end edges of the leather lining are preferably undercut as illustrated at 19 so that when said end edges are straightened out, the under-cut portions will engage the end walls of the slot and prevent the accidental displacement of the same.

Formed on the front side of the rest member 14, is a hooked-shaped projection 20 adapted to engage and serve as a fulcrum support for a lever comprising a trunnion 21 which connects a pair of side arms 22 in the manner shown in Fig. 2. Pivotally supported at 23 to the lever, is a link which is connected at its upper end to the uppermost bow *d*, said link consisting substantially of a rod 24 to the lower end of which is adjustably secured, as for instance, by screwthreads, engaging a bifurcated shackle member 25.

By referring to Fig. 3 it will be noted that when the lever L is in the position shown, the pivot point 23 will be slightly back of the fulcrum point 21, so that therefore a locked toggle joint is established between the link and the hook. When it is desired to disengage the same, or when the link 24 is in inactive condition, as is for instance indicated by dot-and-dash lines in Fig. 3, said lever can be readily disengaged from the hook and swung upward into the position shown by dotted lines L' in Fig. 1, in which position it may be secured to the side of the bow by a button 26. By virtue of the screwthreaded connection between the rod 24 and the member 25, the length of the link may be readily adjusted, it being understood that the swivel motion of the lever L may occur in both directions so that an adjustment of one-half turn of the shackle 25 or any multiple thereof may be made without destroying the efficiency and operation of the lever L.

Changes may be made in the general organization of my present device, as well as in the particular construction of some of its component elements, without departing from the spirit of the invention, especially in the manner of adjusting the link to the various requirements as to height, and also in the particular manner of articulating the toggle lever to said link.

I claim:—

In a bow holder for vehicle tops, the combination with bows adapted to be swung to position one above the other, of a rest member having at one side thereof a hook shaped projection, a link pivotally connected to the uppermost bow, a bifurcated shackle screwed upon said link, a toggle lever pivoted intermediate its ends in said bifurcated shackle, said toggle lever having one end thereof adapted to engage the underside of said hook shaped projection and the opposite end thereof slotted, and a turn button carried by the uppermost bow and adapted to extend through the slotted end of said toggle lever and to hold said lever in parallelism with the uppermost bow when said holder is not in use.

In testimony whereof I affix my signature in presence of two witnesses.

PAUL A. SCHULERT.

Witnesses:
CHAS. F. SCHMELZ,
H. D. MACDONALD.

Copies of this patent may be obtained for five cents each, by addressing the "Commissioner of Patents, Washington, D. C."